No. 797,004. PATENTED AUG. 15, 1905.
J. D. ISAACS.
COAL BUCKET.
APPLICATION FILED MAR. 27, 1905.

3 SHEETS—SHEET 1.

Witnesses:
Arthur L. Sleer.
J. Compton.

Inventor.
John D. Isaacs
by Wm. F. Booth
his Attorney

No. 797,004. PATENTED AUG. 15, 1905.
J. D. ISAACS.
COAL BUCKET.
APPLICATION FILED MAR. 27, 1905.

3 SHEETS—SHEET 2.

Witnesses.
Arthur L. Slee.
J. Compton.

Inventor.
John D. Isaacs
by Wm F. Booth
his Attorney.

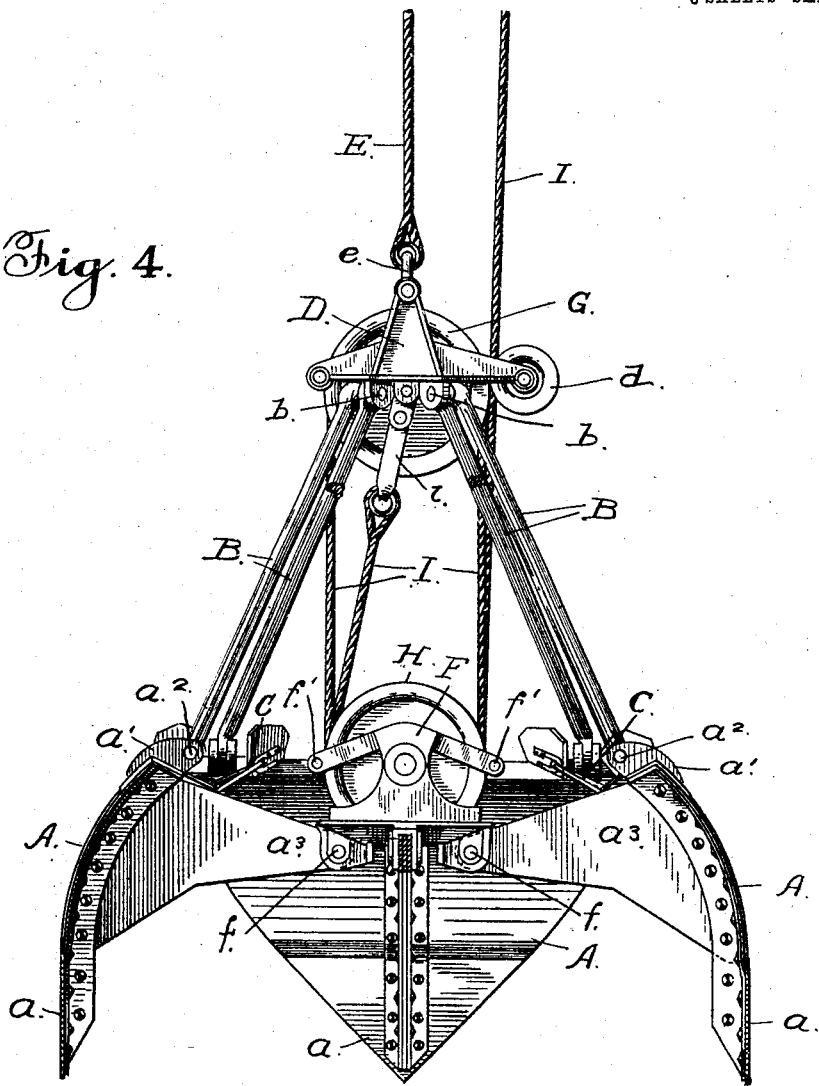

UNITED STATES PATENT OFFICE.

JOHN D. ISAACS, OF OAKLAND, CALIFORNIA.

COAL-BUCKET.

No. 797,004.  Specification of Letters Patent.  Patented Aug. 15, 1905.

Application filed March 27, 1905. Serial No. 252,269.

*To all whom it may concern:*

Be it known that I, JOHN D. ISAACS, a citizen of the United States, residing at Oakland, Alameda county, State of California, have invented certain new and useful Improvements in Coal-Buckets; and I hereby declare the following to be a full, clear, and exact description of the same.

My invention relates to that class of buckets variously termed "coal" or "dredging" or "grappling" or "hoisting" buckets, and particularly to that type in which the wings, leaves, or sections of the bucket are sectors which when closed meet in a common point below. This general type of bucket, as distinguished from another type in which the sections are "quadra-cylindrical," meeting in a common line below, has come to be known and called the "orange-peel" type from the fact that the leaves of the bucket are spherical sectors and when closed form approximately a hollow globe or sphere resembling the cut shape of an orange-peel. My invention, while relating to this sector or orange-peel type in that the leaves meet below in a common point, differs therefrom and is an improvement thereon in the fact that all horizontal sections of the bucket are straight-sided—that is, are bounded by straight lines—the bucket being composed of leaves or sections, each being a straight plane from side to side horizontally, while curving from top to bottom vertically. In this shape of the leaves and the resulting bucket my invention essentially consists, while it also consists in the novel construction and arrangement of parts by which an operative, practical, and economical bucket is produced, which result is the object of the invention, as will hereinafter clearly appear.

Figure 1:
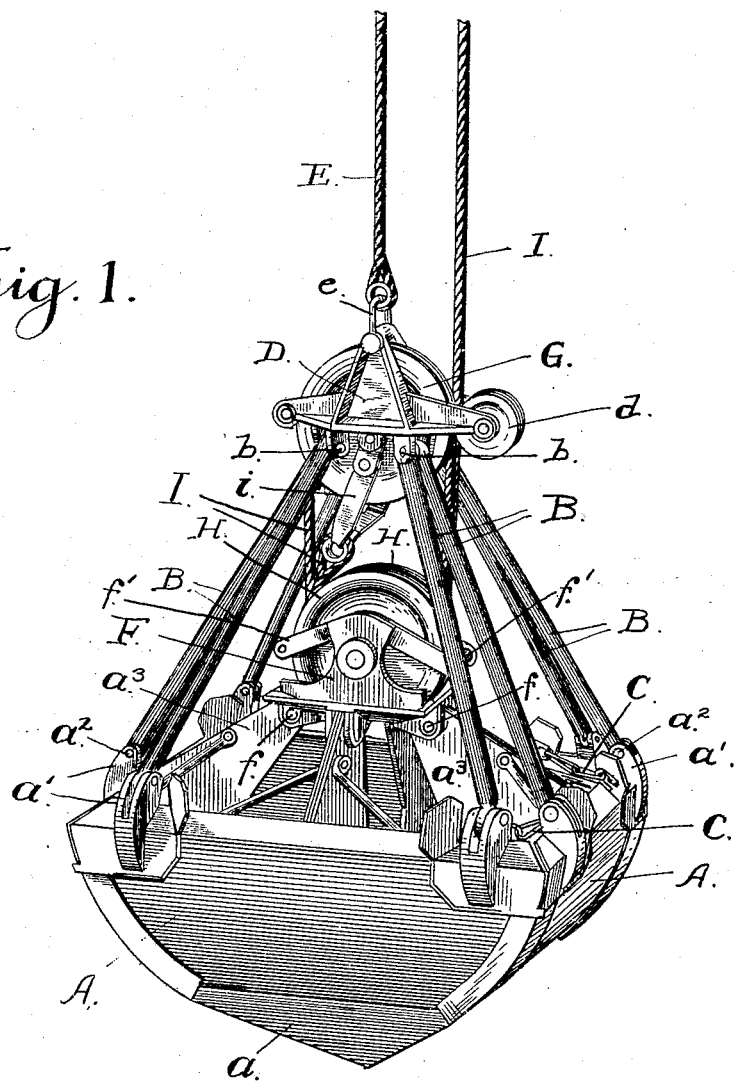
Figure 2:
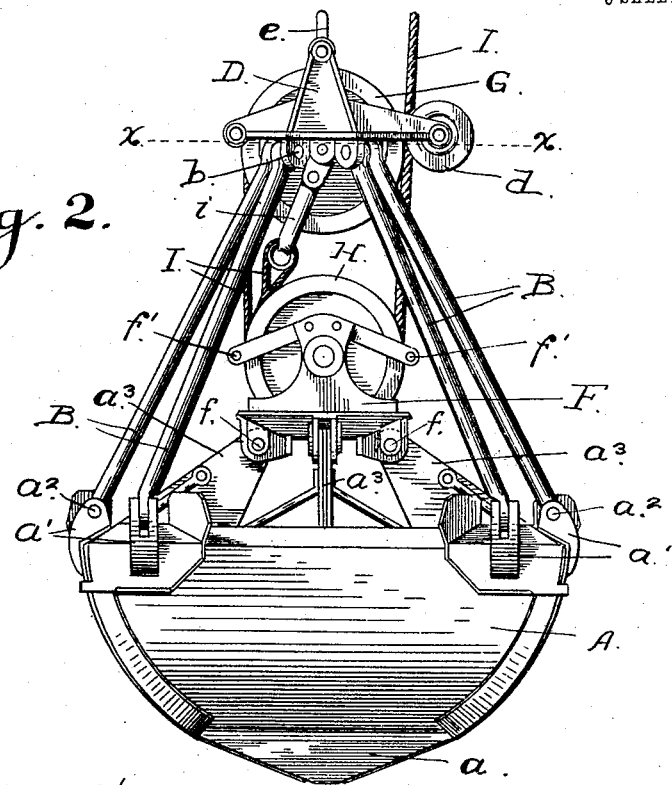
Figure 3:
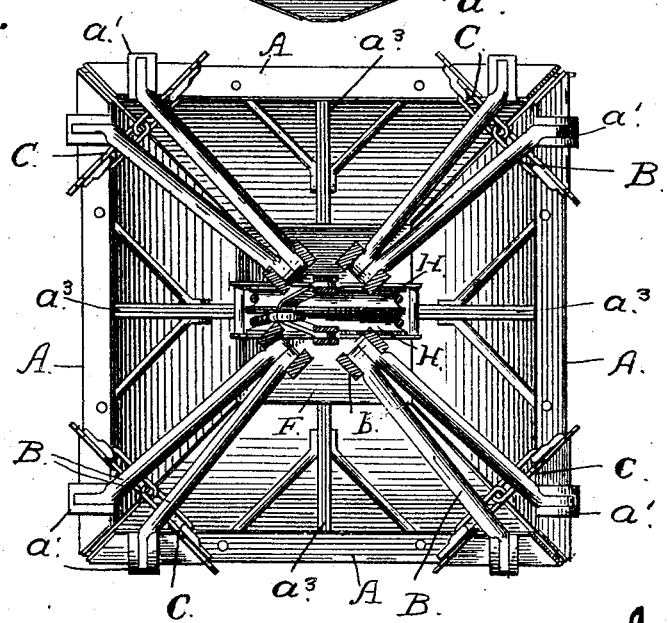

Referring to the accompanying drawings, Figure 1 is a perspective view of my bucket. Fig. 2 is a side elevation of the same. Fig. 3 is a plan of the same on the line $xx$ of Fig. 2. Fig. 4 is a side elevation of the bucket, showing it open, the near leaf being omitted.

The leaves, wings, or sections A of the bucket may be in any number. Four are here shown as representing the most practical number. Each leaf is an isosceles triangle inverted—that is, base uppermost. The base-line of each leaf and every horizontal section of the leaf is a straight line, while each side line of each leaf and every vertical section of the leaf is a curved line. The leaves when closed form an inverted hollow pyramid with its walls straight horizontally and curved vertically.

In practical construction each leaf is formed with a toe piece or point $a$ detachably secured to it, so that the point of the bucket, which receives the wear, may be renewed when necessary.

Each leaf is hinged near each end or corner of its top to the lower end of a hanger-rod B, the foot of the rod entering between the ears of a bracket $a'$ on the leaf and receiving a hinge-bolt $a^2$. There are thus eight rods B, two rods suspending and hinging each leaf. This gives a wide and very stable hinge-base for the leaves. The leaves are further held closely together at their corners by the short chains C diagonally across the corners and properly secured to the leaves.

The hanger-rods B converge upwardly and are pivoted at the point $b$ to a head-casting D, to which the lowering and opening cable E is connected through the intervention of the clevis $e$.

F is a lower or foot casting, to which the levers $a^3$, secured to and projecting inwardly from the leaves A, are pivoted at points $f$.

The head-casting carries a single sheave G, and the foot-casting carries a double sheave H. The lower end of the hoisting and closing cable I is connected by a link $i$ with the head-casting D, said cable thence passing down to and around one of the lower sheaves H, thence up to and over the upper sheave G, thence down to and around the other lower sheave H, and thence up past a guide-pulley $d$ on the head-casting to its winding down.

Suitable guides $f'$ on the foot-casting direct the course of the cable about the sheaves H.

The operation of the bucket, as far as the opening and closing mechanism is concerned, is substantially similar to that of constructions already known—that is to say, as the bucket descends under the taut lowering-cable E and slack hoisting-cable I the weight of the foot-casting F, through the levers $a^3$, throws and holds the leaves A open, as shown in Fig. 4; but upon slacking up cable E and hoisting on cable I the foot-casting is lifted and through the levers $a^3$ causes the leaves to close.

The wide hinge-base of each leaf, due to its connection near each corner, together with the corner-holding chains C, gives a rigidity to the leaves and their joints which is not to be found in the common orange-peel bucket, the hinge connection of which is in its central vertical line, resulting in a marked instability and looseness under hard usage and a failure to shut closely, especially at the corners.

Having thus described the invention, what is claimed as new, and desired to be protected by Letters Patent, is—

1. A bucket of the class described composed of leaves, each leaf being the shape of an inverted isosceles triangle straight in horizontal section and curved in vertical section, suitable hinge connections with the top of each leaf near each end thereof, and suitable mechanism to open and close said leaves.

2. A bucket of the class described composed of leaves, each leaf being the shape of an inverted isosceles triangle straight in horizontal section and curved in vertical section, suitable hinge connections with the top of each leaf, chains connecting the adjacent ends of the leaves at the corners of the bucket, and suitable mechanism to open and close said leaves.

3. A bucket of the class described composed of leaves, each leaf being of the shape of an inverted isosceles triangle straight in horizontal section and curved in vertical section, suitable hinge connections with the top of each leaf near each end thereof, chains connecting the adjacent ends of the leaves at the corners of the bucket, and suitable mechanism to open and close said leaves.

In witness whereof I have hereunto set my hand.

JOHN D. ISAACS.

Witnesses:
  GEORGE R. GAY,
  DANIEL EWING.